Oct. 25, 1955 L. A. DORFF 2,721,935
DUPLEX RADIO TELEPHONE SYSTEM
Filed Dec. 28, 1951
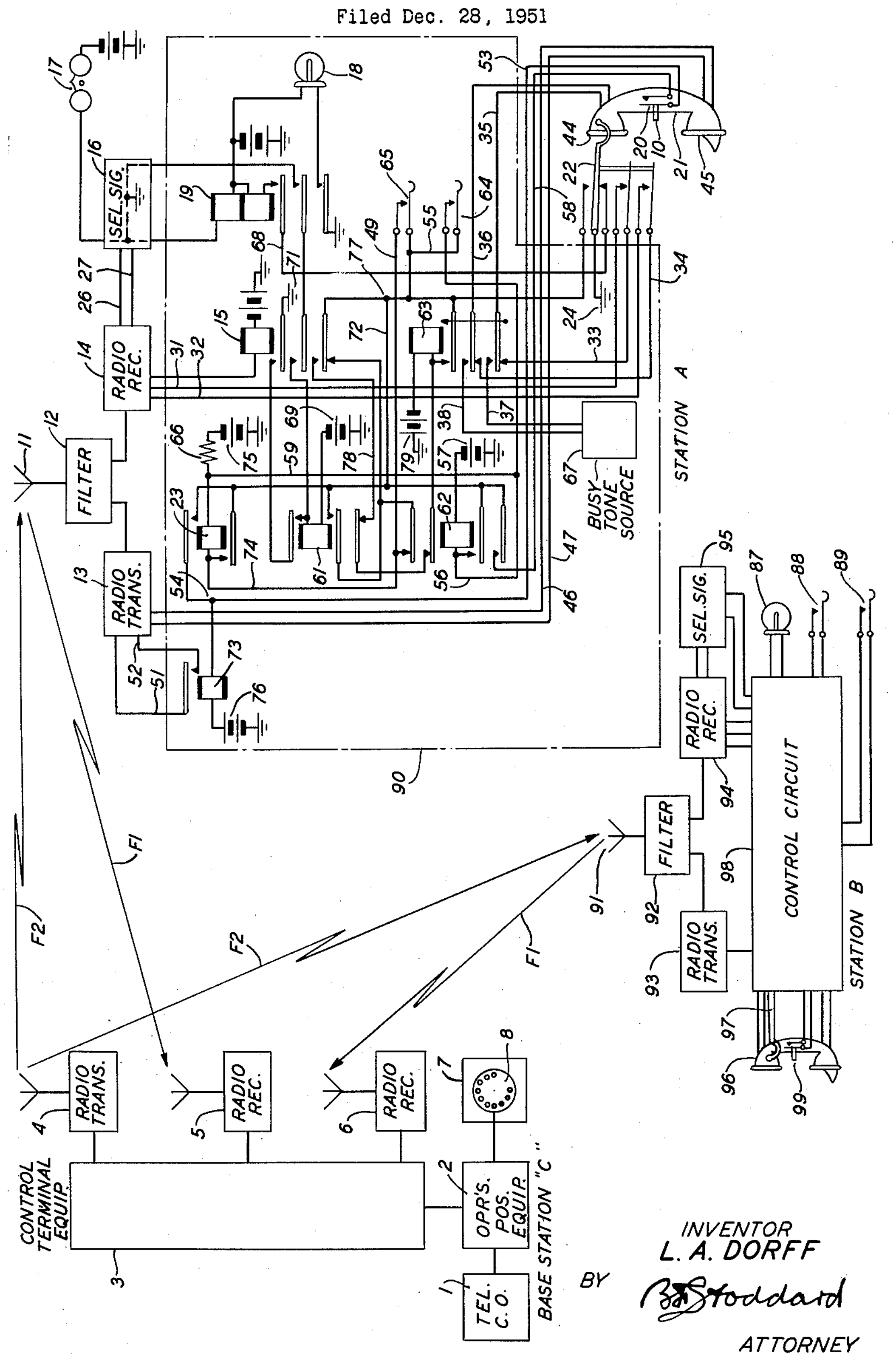
INVENTOR
L. A. DORFF
BY B. J. Stoddard
ATTORNEY United States Patent Office 2,721,935

Patented Oct. 25, 1955

2,721,935

DUPLEX RADIO TELEPHONE SYSTEM

Louis A. Dorff, Glen Ridge, N. J., assignor to Bell Telephone Laboratories, Incorporated, New York, N. Y., a corporation of New York Application December 28, 1951, Serial No. 263,760

5 Claims. (Cl. 250—6)

This invention relates to radio telephone communication systems and, more particularly, to a single channel full duplex radio telephone communication system. The invention may be used with advantage in radio telephone systems having certain of their stations carried on passenger vehicles.

In a single channel full duplex radio telephone system having a control station serving a plurality of customer's radio stations, it is advisable for obvious reasons to employ privacy means for preventing any of the customers from listening to communications between other customers. It is also advisable to employ lock-out means for preventing a customer from initiating a call during periods when another customer is using the single channel. In such a system, situations of an emergency nature may arise which would justify the interruption of a call, but this cannot readily be done because both the privacy and lock-out means tend to prevent a customer from breaking-in on a call that is already in progress. There may also be occasions when one customer might wish to make a call over the single signaling channel to another customer in the same system, such a call being known to those skilled in the art as a reverting call. However, as soon as the first customer places his call, the privacy and lock-out means at the other customer's station tend to prevent the radio telephone equipment at that station from being placed in condition for communication purposes.

Accordingly, it is an object of this invention to provide an improved single channel full duplex radio telephone communication system.

Another object of the invention is to provide improved break-in means for enabling a customer at one station in a single channel full duplex radio telephone system, having privacy and lock-out means, to interrupt a call established by a customer at another station.

A further object of the invention is to provide improved means for placing reverting calls between customers at different stations in the same radio telephone system and over a common radiant energy signaling channel, each station being equipped with privacy and lock-out means.

These and other objects of the invention are accomplished in a manner that is fully explained hereinafter in connection with the following detailed description of the drawing which represents a full duplex single channel radio telephone system having a control station and a plurality of customers' stations.

The radio communication system shown in the drawing comprises a control radio telephone station C and a plurality of customers' radio telephone stations A and B. It is to be understood that the system may include more than two customers' stations and that one or more of them may be carried on passenger vehicles. The control, or base, station C is similar to that disclosed by A. C. Peterson in an article entitled "Vehicle Radio Telephony Becomes a Bell System Practice" and published in volume 25 of the "Bell Laboratories Record" on pages 137 to 141, inclusive. The control station C is shown in the drawing to include a conventional telephone central office 1 which is connected to the usual operator's switchboard position equipment 2 which in turn is connected to standard control terminal equipment 3. The terminal equipment 3 is also connected to a conventional radio transmitter 4 and to conventional radio receivers 5 and 6. The number of radio receivers employed is not critical only one need be used but, if desired, three or more may be used to obtain the benefits of space diversity reception. In order to transmit selective calling signals to the various customers' stations, the operator's position equipment 2 has connected thereto conventional selective calling equipment 7 having a dial 8. This selective calling equipment 7 may be of any suitable design, such as that disclosed by C. N. Anderson and H. M. Pruden in an article entitled "Radiotelephone System for Harbor and Coastal Services" and published on pages 245 to 253, inclusive, of the "Proceedings of the Institute of Radio Engineers," volume 27, 1939.

Although the function of the control terminal equipment 3 is well known in the art, it may be mentioned that it serves to connect the talking circuit from the telephone central office 1 to the radio transmitter 4 and radio receivers 5 and 6. It also functions to enable the operator's position equipment 2 to control the operation of the radio transmitter 4 and to apply to the transmitter 4 selective calling signals from the selective calling equipment 7. In addition, the terminal equipment 3 selects that one of the radio receivers 5 and 6 having the better quality of reception.

The customer's station A is provided with a single antenna 11 for both receiving and transmitting carrier waves. The antenna 11 is coupled through a filter 12 to a radio transmitter 13 and a radio receiver 14. The receiver 14 includes a conventional codan control circuit of any suitable design, such as that disclosed on page 653 of F. E. Terman's "Radio Engineers' Handbook," for controlling the energization of a codan relay 15. As is well known to those skilled in the art, the codan control circuit is designed to cause the normally unenergized codan relay 15 to become energized in response to the reception by the receiver 14 of carrier energy. The output from the receiver 14 is coupled to selective signal receiving equipment 16 of any suitable design, such as that described by B. P. Cottrell in an article entitled "Selective Calling for Mobile Telephone Services" and published on pages 32 to 34, inclusive, of "FM and Television," issue of January, 1948. When the particular selective calling signal assigned to station A is received, the equipment 16 functions to effect the ringing of a call bell 17, the lighting of a call lamp 18, and the energization of a call relay 19.

The station A is also equipped with a signal reproducer in the form of a telephone instrument 21, and a holder 22 for holding the telephone instrument 21 during idle periods. Although the holder 22 is represented in the drawing as being in the form of a hook switch, any other suitable type of control switch-holder may be used if desired. The telephone instrument 21 is provided with a conventional push-to-talk button 10 for effecting the closure of a normally open contact 20. The equipment at station A also includes a number of relays for performing various control functions that are described hereinafter. These relays include a control relay 61, a reverting call relay 62, a start relay 23, a power relay 73, and a busy tone relay 63. The equipment also comprises a reverting call key 64, and emergency break-in key 65, a shunt resistor 66, and a source 67 of busy tone.

The other customers' station B is equipped in a manner similar to station A, and is represented in the drawing in block schematic form for the purpose of simplicity. It comprises a single antenna 91 coupled through a filter 92 to a radio transmitter 93 and a radio receiver 94.

Also, it is provided with selective signal receiving equipment 95 and a telephone instrument 96 which is held during idle periods by a holder 97. The telephone instrument 96 is provided with a conventional push-to-talk button 99. The elements 93 to 97, inclusive, are connected to a control circuit represented by the block 98. This control circuit 98 includes equipment similar to that enclosed within the broken line 90 at station A and performs the same functions. The control circuit 98 is indicated as having connected thereto a call lamp 87, an emergency break-in key 88, and a reverting call key 89.

The radiant energy signaling channel assigned to the system comprises two frequency allocations. One frequency allocation, F1, is employed for the transmission of carrier waves from the customers' stations A and B to the control station C. Accordingly, the customers' radio transmitters 13 and 93 are each designed to produce carrier waves having a mean frequency of F1, and the radio receivers 5 and 6 at the control station C are tuned to receive these carrier waves. Similarly, the other frequency allocation, F2, is employed for the transmission of carrier waves from the control station C to the customers' stations A and B. Therefore, the radio transmitter 4 at the control station C is designed to produce carrier waves having a mean frequency of F2 and the radio receivers 14 and 94 at the customers' stations A and B are tuned to receive these carrier waves. These carrier waves of mean frequencies F1 and F2 are not radiated during idle periods but only when signaling is taking place. It may be mentioned at this point that the filters 12 and 92 at the customers' stations A and B are designed to have sufficient frequency discrimination to prevent their associated transmitters 13—93 from overloading the inputs of their associated receivers 14—94, respectively.

In originating a call from the control station C to any one of the customers' stations, such as the station A, the operator at station C starts the radio transmitter 4 in a conventional manner, such as is described in the above-mentioned article by A. C. Peterson, and causes it to radiate its carrier. Reception of this carrier energy at each of the customers' stations will effect the energization of their respective codan relays 15 which will thereupon operate their armatures. The operator next rotates the dial 8 of the selective signaling equipment 7 to apply to the transmitter 4 the particular selective calling signal which is assigned to station A. Accordingly, the carrier waves radiated by the transmitter 4 will now be modulated with this selective calling signal.

These modulated carrier waves will be received at each of the customers' stations but, as this particular calling signal is assigned to only the station A, only the selective signal receiving equipment 16 at station A will be operated by this calling signal. The path for operating the equipment 16 extends from the receiver 14 along conductors 26 and 27. The equipment 16 responds to the selective calling signal by connecting its ground to the call bell 17, the winding of the call relay 19, and to the middle contact associated with the relay 19. Accordingly, the bell 17 rings and relay 19 operates its armatures, the outer armature closing an obvious circuit for lighting the call lamp 18. Thus, the customer at station A is provided with both audible and visual warning indications that he is being called.

At this same time, the operation of the middle armature of the call relay 19 connects the ground in the selective equipment 16 over the operated middle armature of the codan relay 15 and through the winding of the control relay 61 to battery 69. Relay 61 now operates its armatures and locks-up over its top armature and the inner operated armature of the codan relay 15 to ground 71. Thus, the control relay 61 will remain energized as long as the received carrier energy holds the codan relay 15 energized. The operation of the two lower armatures of relay 61 perform circuit conditioning functions that are described hereinafter.

Since the selective calling signal only lasts for about four or five seconds, the above-mentioned ground connections will be disconnected at the end of this interval of time. However, relay 19 is provided with a locking circuit extending over its inner armature along conductor 68 and over the normally closed spring contact of the hook switch 22 to ground 24 so that both the call lamp 18 and the call relay 19 will remain energized until the customer at station A answers the call by removing his telephone instrument 21 from its holder 22.

In the event the customer does not answer the call promptly, as would be the case if he were absent from station A, the operator at station C will abandon the call and will stop the operation of her radio transmitter 4. Since the codan control circuit in the receiver 14 at station A will now not receive any carrier energy, it will effect the deenergization of the codan relay 15. Relay 15 will now release its armatures thereby opening the locking circuit of the control relay 61 which also releases its armatures. The call relay 19 remains locked-up, as was stated above, to hold the call lamp 18 lighted. When the customer returns to his station A, the lighted call lamp 18 serves to inform him that his station was called during his absence. He should then remove his telephone 21 from its holder 22 and call the operator at the control station C.

If the customer is present at station A when the call is initiated from the control station C and wishes to answer the call, he does so by removing the telephone 21 from its holder 22. This releases the springs of the hook switch 22 which now move upward to engage their upper contacts. The upward movement of the top hook switch spring opens the locking circuit of the call relay 19 which thereupon releases its armatures, the release of its outer armature opening the lighting circuit of the call lamp 18. The engagement of the two lower hook switch springs with their contacts connects the radio receiver's audio output circuit comprising conductors 31 and 32 to conductors 33 and 34, respectively. These latter conductors are connected by the two outer unoperated armatures of the busy tone relay 63 to conductors 35 and 36 extending to the receiver 44 of the telephone instrument 21. Thus, the telephone receiver 44 is coupled to the radio receiver 14.

It should be noted that, although the transmitter 45 of the telephone instrument 21 is connected at all times to the audio input circuit of the radio transmitter 13 by conductors 46 and 47, the radio transmitter 13 is normally unenergized due to its conventional power control circuit, which extends along conductors 51 and 52, being open at the armature and contact of the power relay 73. However, when the hook switch 22 moves upward, ground 24 is applied over its top contact, along conductor 72, over the operated inner bottom armature of the control relay 61, then down and over the released outer top armature of the reverting call relay 62, up along conductor 74, through the winding of the start relay 23, and then through the resistor 66 to battery 75. This effects the energization of the start relay 23 which operates its armatures and locks-up over its bottom armature, along conductor 72 and then over the top hook switch contact to ground 24.

A circuit is now closed extending from ground 24, along conductor 72, over the operated top armature of the start relay 23, and then through the winding of the power relay 73 to battery 76. This effects the energization of the power relay 73 which operates its armature thus closing the conventional power control circuit 51—52 of the radio transmitter 13 and starting its operation in a manner well known to those skilled in the art. The resulting carrier waves now generated by the radio transmitter 13 are radiated by the antenna 11 and are received by one or more of the radio receivers 5 and 6 at the control station C. This completes the conditioning of the radiant energy signaling system for communication purposes, and communication may now take place on a full duplex basis.

At the completion of the call, the customer at station A replaces his telephone 21 upon its holder 22 thereby forcing the springs of the hook switch 22 to move down out of engagement with their upper contacts. This movement of the two lower springs disconnects the radio receiver's audio output leads 31 and 32 from the receiver 44 of the telephone 21. The downward movement of the hook switch 22 disconnects ground 24 from the locking circuit of the start relay 23 and also from the energizing circuit of the power relay 76. Relays 23 and 76 consequently release their armatures. The release of the armature of the power relay 76 opens the power control circuit of the radio transmitter 13 which accordingly discontinues the generation of carrier energy.

Meanwhile, the operator at the control station C has discontinued the operation of her radio transmitter 4 in a manner well known to those skilled in the art. Since no carrier energy having a mean frequency F2 will now be received by the antenna 11 at station A, the conventional codan control circuit in the radio receiver 14 will now effect the deenergization of the codan relay 15 which releases its armatures. The release of the inner armature of relay 15 opens the locking circuit of the control relay 61 which releases its armatures. This completes the restoration of the system to its normal idle condition.

In originating a call from any one of the customers' stations, such as the station A, to the control station C, the customer at station A first removes his telephone instrument 21 from its holder 22 thereby permitting the springs of the hook switch 22 to move upward to engage their upper contacts. The engagement of the top spring with its upper contact connects the ground 24 to the junction point 77. If the operator at the control station C is communicating with a customer at another station in this system at this time, then her carrier will be received by the radio receiver 14 with the result that the codan relay 15 will be energized and its armatures will be operated. The operation of the outer bottom armature of the codan relay 15 prevents the ground 24 from being extended to the winding of the start relay 23, and, consequently, the start relay 23 cannot now be energized. This prevents the customer at station A from starting his radio transmitter 13 as this would interfere with the other call. Instead, the application of ground 24 to the junction point 77 is extended over the operated outer armature of the codan relay 15, along conductor 78, over the released outer bottom armature of the control relay 61, down and over the released inner top armature of the reverting call relay 62, and then through the winding of the busy tone relay 63 to battery 79.

This effects the energization of relay 63 which operates its armatures and locks-up over its inner armature and top hook switch contact and spring to ground 24. The operation of the middle and outer armatures of relay 63 switches the telephone receiver leads 35 and 36 from conductors 33 and 34 and connects them instead to conductors 37 and 38, respectively, which are the output leads of the busy tone source 67. The source 67 may be of any suitable design producing an audible tone. The customer at station A will now hear this tone in his telephone receiver 44 and will thus be informed that the channel is busy. This also prevents the customer at station A from listening in to messages directed to a customer at another station and thereby insures privacy of communication. Upon hearing the busy tone, the customer at station A should replace his telephone 21 upon its holder 22 and try again at a later time. The placing of the telephone 21 on its holder 22 operates the hook switch springs thereby opening the locking circuit of the busy tone relay 63 which accordingly releases its armatures.

If the channel is idle, no carrier energy will be received and the codan relay 15 will not be energized. Accordingly, when the customer at station A now lifts up his telephone 21, a path will be closed from ground 24, through the top contact of the hook switch 22, junction point 77, over the released outer armature of the codan relay 15, over the released outer top armature of the reverting call relay 62, along conductor 74, winding of the start relay 23, and then through the resistor 66 to battery 75. This energizes the start relay 23 which operates its armature and locks-up over its bottom armature and along conductor 72 to ground 24. The operation of the top armature of relay 23 closes the above-described circuit for energizing the power relay 73. Relay 73 now operates its armature to close the power control circuit 51—52 of the radio transmitter 13 which starts to radiate its carrier. This carrier will be received by one or more of the radio receivers 5 and 6 at the control station C and will effect the lighting of a call lamp at the operator's position equipment 2 in a manner well known in the art. The operator at station C answers the call by starting her radio transmitter 4, and the system is thus placed in condition for the call to proceed on a full duplex basis. Termination of the call is effected in the same manner as that described above.

Since the single radiant energy signaling channel F1—F2 is assigned for use by a plurality of customers, it resembles somewhat a conventional party line in an ordinary telephone system. Therefore, when the customer at station A wishes to make a reverting call over the single channel F1—F2 to a customer at another station in the system, this will be in the nature of a call from one party line telephone subscriber to another telephone subscriber assigned to the same party line. The placing of such a reverting call will now be described with the assumption that the customer at station A wishes to call the customer at station B. Firstly, the customer at station A places a call to the operator at the control station C in the manner described above. When the operator answers the call, the customer at station A will give the desired customer's call number. On hearing the called customer's number, the operator at the control station C will presumably recognize it as being assigned to a customer whose station is allotted the same radiant energy signaling channel F1—F2. Accordingly, she should then instruct the calling customer at station A to do the following: operate momentarily the non-locking reverting call key 64, listen for the called customer to answer, and then use the push-to-talk button 10 each time he wishes to talk.

After thus instructing the customer at station A, the operator at the control station C then calls the customer at station B in the manner described above to effect the lighting of his call lamp 87. Assuming that the customer is present at station C and wishes to answer the call, he does so in the manner set forth above. The operator at the control station C now informs him that another customer using the same channel wishes to speak to him and that he should therefore operate momentarily his reverting call key 89 and then use his push-to-talk button 99 whenever he wishes to transmit during the course of the call.

When the customer at station A operates his reverting call key 64, a circuit is closed extending from ground 24, over the top hook switch contact, along conductor 55, over the operated key 64, along conductor 56, and then through the winding of the reverting call relay 62 to battery 57. Accordingly, relay 62 becomes energized and operates its armatures to lock-up over its inner bottom armature and along conductor 72 to the ground 24. The operation of its outer top armature opens an energizing circuit of the start relay 23. Similarly, the operation of its inner top armature opens the energizing circuit of the busy tone relay 63. The operation of its outer bottom armature closes a circuit from one of the push-to-talk contacts 20, along conductor 58, outer bottom armature of relay 62, along conductor 72, and then over the top hook switch contact to ground 24. At the same time that the operation of key 64 connected ground 24 to the winding of relay 62, it also applied ground 24 along conductor 59 to the shunt resistor 66. This closes a shunt path across the winding of the start relay 23 which thereupon releases its armatures. The release of the top armature of relay 23 opens the above-described path for energizing the power relay 73. Relay 73 now releases its armature to open the power control circuit 51—52 of the radio transmitter 13 which consequently discontinues the generation of carrier energy.

In answering the call, the customer at station B transmits signal-modulated carrier waves having the assigned means transmitting frequency F1. These carrier waves are received by one or more of the radio receivers 5 and 6 at the control station C. The modulating signals are then applied by the control terminal equipment 3 to the radio transmitter 4 for modulating its carrier waves which, as was stated above, have a mean frequency F2. These last-mentioned carrier waves are received by the radio receiver 14 at station A. Since the telephone receiver 44 has remained connected to the audio output circuit of the radio receiver 14 during the above-mentioned operations, the customer at station A will now hear the answer made by the customer at station B. Accordingly, the customer at station A pushes his push-to-talk button 10 to effect the closure of the associated contacts 20. Due to one of these contacts being connected to the ground 24 by the operation of the outer bottom armature of relay 62, as was explained above, the closure of the contacts 20 extends the circuit from ground 24 along conductor 53 to the junction point 54 and then through the winding of the power relay 73 to battery 76. This causes relay 73 to operate its armature to effect the starting of the radio transmitter 13. The call then proceeds on a half-duplex basis with each customer pushing his respective push-to-talk button when he wishes to talk. At the termination of the call, each customer replaces his telephone instrument on its holder. This opens the locking circuit of the reverting call relay 62 at each customer's station and restores the system to its normal idle condition.

As was stated above, situations of an emergency nature may arise which would justify the interruption by a customer at one station of a call being made by a customer at another station. This can be accomplished in a manner that will now be described. Assuming that a need arises for making an emergency call from station A, the customer at station A will remove his telephone 21 from its holder 22. If it be also assumed that at this time a call from the customer at station B is in progress, then the codan relay 15 at station A will be energized. Consequently, the removal at station A of the telephone 21 from its holder 22 will now effect the energization of the busy tone relay 63. Upon hearing the busy tone in his telephone receiver 44, the customer operates his emergency call key 65. This closes a circuit extending from ground 24, top hook switch contact, operated key 65, along conductors 49 and 74, through the winding of the start relay 23, and then through resistor 66 to battery 75. Relay 23 now becomes energized and operates its armatures to lock-up and also to effect the energization of the power relay 73, which, in turn, effects the starting of the radio transmitter 13 in the manner described above.

With his carrier now on the air, the customer at station A can interrupt the call in progress by stating the nature of the emergency and by requesting the use of their common signaling channel. If the customer at station B accedes to this request, he replaces his telephone 96 on its holder 97 which causes his radio transmitter 93 to discontinue the generation of carrier energy. This clears the common signaling channel for the exclusive use of the customer at station A, and he now proceeds with his emergency call. This call is terminated in the same manner as that described above.

Since it is desirable that the use of the emergency call key 65 should be reserved for genuine emergencies, its indiscriminate use may be discouraged to a certain extent by placing it in an inconspicuous location and by covering it with a conventional spring-restoring cover. It is to be understood, of course, that in addition to these precautions, all of the customers should be instructed to use their emergency break-in keys only in a real emergency.

This particular embodiment of the invention has been described in order to explain the principles and features of operation of the invention. It is to be understood that the invention is not limited to the specific circuit construction shown in the drawing as various modifications may be made without exceeding the scope of the invention. For example, certain features of the invention are not restricted to use in a single channel system nor to use in a full duplex system but may be used with advantage in various other types of signaling systems, such as multichannel systems, simplex systems, and half-duplex systems. Therefore, the invention is to be limited only by the claims appended hereto.

What is claimed is:

1. In a full duplex radio telephone communication system having radiating means for radiating both carrier current and selective calling signals, a radio transmitting and receiving station comprising in combination a radio receiver, a radio transmitter, said transmitter having a normally open power control circuit, a telephone instrument, a holder for holding said instrument during idle periods, a first electroresponsive instrumentality for effecting the closure of said normally open power control circuit, a first circuit for energizing said first instrumentality, said first circuit having two normally open portions, means responsive to the removal of the telephone instrument from the holder for closing one of the normally open portions of said first circuit, a second electroresponsive instrumentality for closing the second normally open portion of said first circuit, a second circuit for energizing said second instrumentality, said second circuit having two normally open portions, a first electroresponsive device responsive to the reception of carrier current by said radio receiver for closing one of the normally open portions of said second circuit, and a second electroresponsive device responsive to the reception of a selective calling signal by said radio receiver for closing the second normally open portion of said second circuit.

2. A duplex radio telephone system having a radiant energy signaling channel allotted thereto for communication purposes, said system comprising a plurality of radio telephone signaling stations each having a radio transmitter for transmitting signals over said channel and a radio receiver for receiving signals transmitted over said channel, a first one of said stations having a telephone instrument and a holder for holding said telephone instrument during idle periods, said telephone instrument including a telephone receiver, said holder having a first position when holding said telephone instrument and a second position when said telephone instrument is removed therefrom for use, a plurality of contacts actuated by the movement of said holder from one of its positions to the other, a first circuit for connecting said telephone receiver to the radio receiver at said first station, a first one of said contacts being actuated for opening a first portion of said first circuit when said holder is in its first position, said first contact being actuated for closing said first portion of said first circuit when said holder is in its second position, a first relay for opening a second portion of said first circuit when energized and for closing said second portion when de-energized, said first and second portions of said first circuit being connected in series, a second circuit for energizing said first relay, a second one of said contacts being actuated for opening a first portion of said second circuit when said holder is in its first position, said second contact being actuated for closing said first portion of said second circuit when said holder is in its second position, a second relay for opening a second portion of said second circuit when de-energized and for closing said second portion when energized, said second relay being normally unenergized, and means for connecting said second relay to said radio receiver at said first station for energizing said second relay only when signals are received by said radio receiver, said first and second portions of said second circuit being connected in series.

3. A duplex radio telephone system in accordance with claim 2 and having a local source of audible tone at said first station in addition to said radio receiver thereat, a third circuit for connecting said local tone source to said telepheone receiver, said third circuit including said first portion of said first circuit, said third circuit having a second portion connected in series with said first portion, said second portion of said third circuit being normally open, and normally unactuated instrumentalities for closing said second portion of said third circuit when actuated, said instrumentalities being actuated in response to the energization of said first relay.

4. A duplex radio telephone system in accordance with claim 2 and having a third relay at said first station for closing a third portion of said second circuit thereat when de-energized and for opening said third portion when energized, said third portion of said second circuit being connected in series with said first and second portions thereof, said third relay being normally unenergized, a fourth circuit for energizing said third relay, said fourth circuit being normally open, and means responsive only to the reception of a particular assigned code signal by said radio receiver at said first station for effecting the closure of said fourth circuit and the consequent energization of said third relay.

5. A duplex radio telephone system in accordance with claim 2 and having a fourth relay at said first station for closing a fourth portion of said second circuit thereat when de-energized and for opening said fourth portion when energized, said fourth portion of said second circuit being connected in series with said first and second and third portions thereof, said fourth relay being normally unenergized, a fifth circuit for energizing said fourth relay, said fifth circuit being normally open, and manually operable means at said first station for closing said fifth circuit for effecting the energization of said fourth relay, said manually operable means being separate from said holder.

References Cited in the file of this patent

UNITED STATES PATENTS

| | | |
|---|---|---|
| 1,572,756 | Smuthe | Feb. 9, 1926 |
| 2,061,699 | Fox | Nov. 24, 1936 |
| 2,472,585 | Hailes | June 7, 1949 |
| 2,501,091 | Preston et al. | Mar. 21, 1950 |
| 2,503,727 | Grondahl et al. | Apr. 11, 1950 |
| 2,530,815 | Dimmer | Nov. 21, 1950 |
| 2,599,097 | Entz | June 3, 1952 |
| 2,623,164 | Herrick | Dec. 23, 1952 |